United States Patent
Cheng et al.

(10) Patent No.: US 10,685,427 B2
(45) Date of Patent: Jun. 16, 2020

(54) IMAGE STITCHING METHOD AND ELECTRONIC DEVICE USING THE SAME

(71) Applicant: Acer Incorporated, New Taipei (TW)

(72) Inventors: Chen-Ju Cheng, New Taipei (TW); Sergio Cantero Clares, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/215,896

(22) Filed: Dec. 11, 2018

(65) Prior Publication Data
US 2019/0279337 A1  Sep. 12, 2019

(30) Foreign Application Priority Data

Mar. 12, 2018  (TW) .............................. 107108230 A

(51) Int. Cl.
| | |
|---|---|
| *G06T 3/40* | (2006.01) |
| *H04N 5/247* | (2006.01) |
| *G06T 7/70* | (2017.01) |
| *H04N 5/232* | (2006.01) |
| *G06K 9/62* | (2006.01) |

(52) U.S. Cl.
CPC .............. *G06T 3/4038* (2013.01); *G06T 7/70* (2017.01); *H04N 5/247* (2013.01); *G06K 9/6202* (2013.01); *G06T 2207/30244* (2013.01); *H04N 5/23238* (2013.01)

(58) Field of Classification Search
CPC ..................... G06T 3/4038; G06T 7/70; G06T 2207/30244; H04N 5/247; H04N 5/23238; G06K 9/6202
See application file for complete search history.

(56) References Cited

U.S. PATENT DOCUMENTS

| | | | | |
|---|---|---|---|---|
| 7,397,511 B2* | 7/2008 | Ezawa | ................... | H04M 1/021 348/373 |
| 7,856,180 B2* | 12/2010 | Chishima | ................ | G03B 17/04 396/324 |
| 2011/0134262 A1* | 6/2011 | Ogasahara | ............. | G03B 17/02 348/222.1 |
| 2014/0168475 A1* | 6/2014 | Corkery | ................. | G03B 37/04 348/239 |
| 2014/0285618 A1* | 9/2014 | Cho | ..................... | H04N 5/2258 348/38 |
| 2016/0248985 A1* | 8/2016 | Mate | ...................... | H04N 5/247 |

* cited by examiner

*Primary Examiner* — Timothy J Henn
(74) *Attorney, Agent, or Firm* — Birch, Stewart, Kolasch & Birch, LLP

(57) ABSTRACT

An electronic device including a bendable base, a plurality of camera modules, a sensing module and a processing module is provided. The camera modules are mounted on the base, and may capture a plurality of images corresponding to different fields of view. The sensing module is coupled to the base for detecting a physical bending information of the base. The processing module is coupled to the camera module and the sensing module for estimating a bending angle of the base according to the physical bending information, obtaining an overlapping information of the images according to the bending angle, and stitching the images according to the overlapping information to create a stitched image.

20 Claims, 4 Drawing Sheets

IMAGE STITCHING METHOD AND ELECTRONIC DEVICE USING THE SAME

This application claims the benefit of Taiwan application Serial No. 107108230, filed Mar. 12, 2018, the subject matter of which is incorporated herein by reference.

BACKGROUND OF THE INVENTION

Field of the Invention

The invention relates in general to an image stitching method and an electronic device using the same.

Description of the Related Art

Along with the advance in the micro-camera technology, more and more products can concurrently use multiple cameras to generate images with a wider field of view, and can be used in capturing panorama images, the monitoring system, and the around view monitoring (AVM) system. Generally speaking, such products can widen the field of view of the outputted images by combining the images captured using multiple lenses, and the widening process is completed by using an image stitching algorithm.

The image stitching algorithm is used for cropping, collaging and stitching a plurality of images corresponding to different fields of view to generate an image with a wider field of view. Current image stitching algorithms can be divided into two categories, namely, the real-time image stitching algorithms and the off-line image stitching algorithms. However, the off-line image stitching algorithms are subjected to certain restrictions regarding the use of foldable multi-lens products. For example, during the off-line processing, the computing device is normally ignorant of the degree to which the product is bent, and therefore needs to use more computing resources to calculate the overlapping region of images before subsequent cropping and collaging processes can be performed.

The difficulties currently encountered by the real-time stitching algorithms are that: during the stitching process, the feature points of each image need to be completely scanned to locate the overlapping region of images. However, since it takes a large amount of time and resources to scan the complete image, the image stitching speed normally cannot meet the low-delay requirement for real-time viewing.

SUMMARY OF THE INVENTION

The present disclosure relates to an image stitching method and an electronic device using the same. A physical bending information of the base is detected by the sensing module mounted on the base, and the current bending angle of the base is estimated according to the obtained physical bending information to locate corresponding overlapping information. Therefore, the time for locating an overlapping region of images by using an image stitching algorithm can be effectively reduced, and the image stitching speed can be increased.

According to one embodiment of the invention, an image stitching method applicable to an electronic device is provided. The electronic device includes a bendable base, a plurality of camera modules mounted on the base, a sensing module coupled to the base, and a processing module coupled to the camera module and the sensing module. The image stitching method includes following steps: capturing a plurality of images corresponding to different fields of view by the camera modules; detecting a physical bending information of the base by the sensing module; estimating a bending angle of the base according to the physical bending information, obtaining an overlapping information of the images according to the bending angle, and stitching the images corresponding to different fields of view according to the overlapping information by the processing module to create a stitched image.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
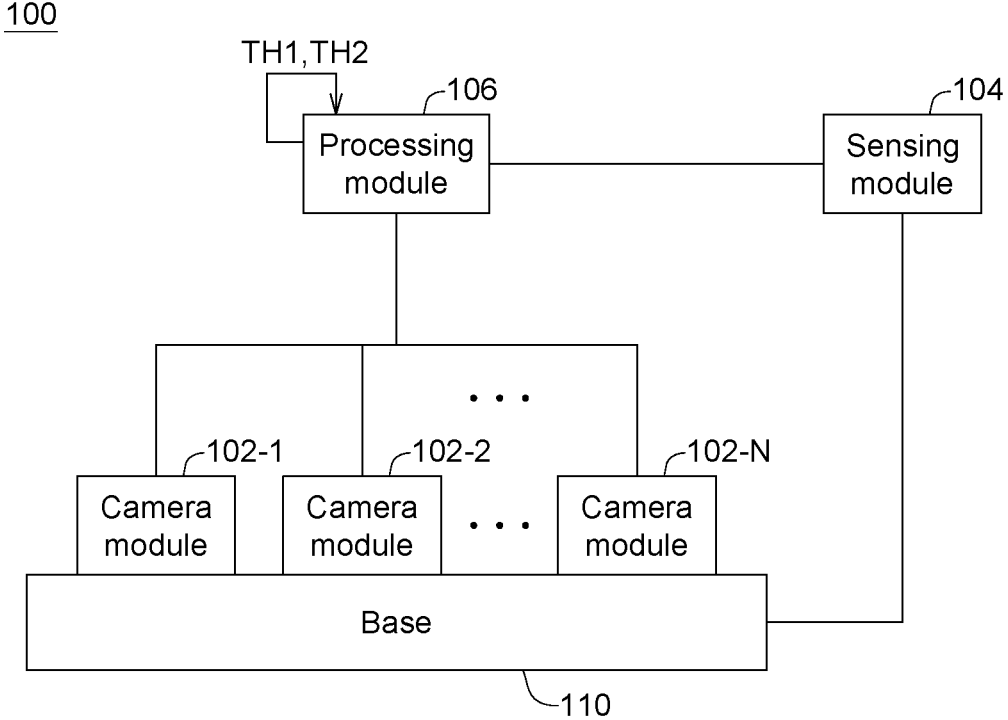
FIG. 1 is a block diagram of an electronic device according to an embodiment of the present disclosure.

FIG. 1 is a block diagram of an electronic device 100 according to an embodiment of the present disclosure.

Referring to FIG. 1, the electronic device 100 includes a bendable base 110, a plurality of camera modules 102-1 to 102-N (N is a positive integer larger than 1), a sensing module 104 and a processing module 106. The base 110 can have a bendable mechanism (such as a pivot) formed of any bendable material such as plastics or resin. The camera modules 102-1 to 102-N can be realized by charge-coupled device (CCD) sensors, complementary metal-oxide-semiconductor (CMOS) sensors or other camera devices. The sensing module 104 can be realized by an accelerometer, a gyroscope, a distance sensor, a resistance/capacitance sensing component or any sensor capable of sensing the change in the bending angle of the base 110. The processing module 106 can be realize by a central processing unit (CPU), a microprocessor, digital signal processor (DSP), a programmable controller, an application specific integrated circuits (ASIC), a programmable logic device (PLD) or other similar devices.

The camera modules 102-1 to 102-N are mounted on the base 110, and respectively may capture a plurality of images corresponding to different fields of view. When the base 110 is bent, the angle between the camera modules 102-1 to 102-N will change. The sensing module 104 is coupled to the base 110 for detecting a physical bending information of the base 110. The processing module 106 is coupled to the camera modules 102-1 to 102-N and the sensing module 104. The processing module 106 can be configured to execute an image stitching method according to an embodiment of the present disclosure.

Figure 2:
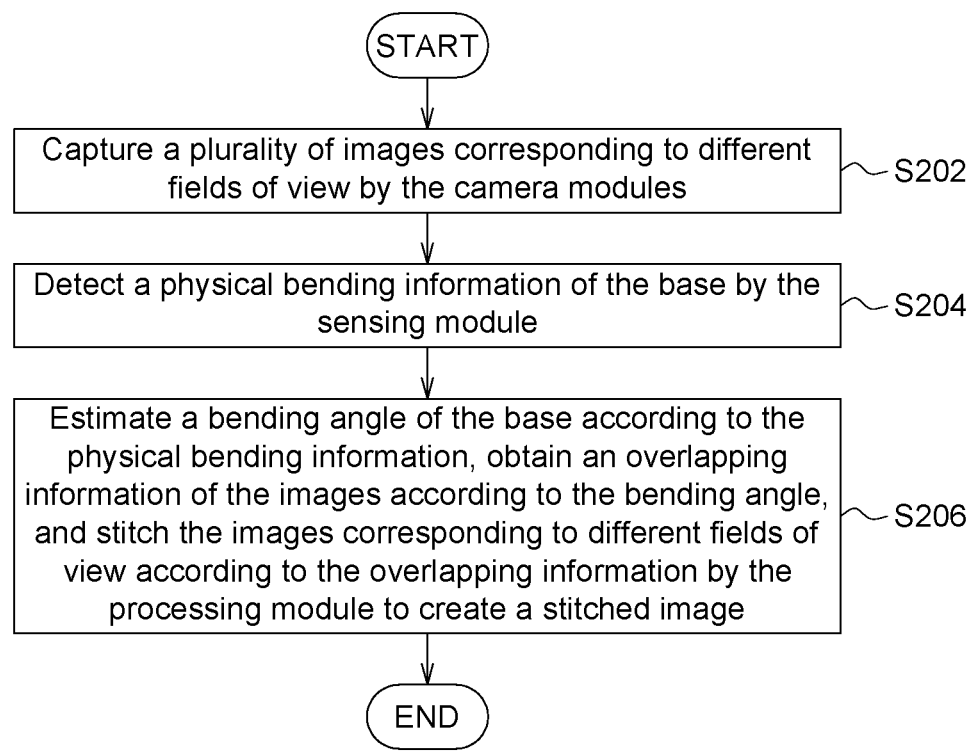
FIG. 2 is a flowchart of an image stitching method according to an embodiment of the present disclosure.

FIG. 2 is a flowchart of an image stitching method according to an embodiment of the present disclosure.

In step S202, a plurality of images corresponding to different fields of view are captured by the camera modules 102-1 to 102-N.

In step S204, a physical bending information of the base 110 is detected by the sensing module 104.

In an embodiment, the physical bending information may include at least one of the following items: resistance variation, capacitance variation, stress variation, deformation, and displacement. For example, the sensing module 104 can be configured at a bendable position of the base 110. When the base 110 is bent, the values of parameters such as resistance capacitance, stress, deformation, and displacement at the bendable position of the base 110 will change. The sensing module 104 can detect the change in parameter value to obtain a physical bending information of the base 110.

In step S206, a bending angle of the base 110 is estimated according to the physical bending information, an overlapping information of the images is obtained according to the bending angle, and the images corresponding to different fields of view are stitched according to the overlapping information by the processing module 106 to create a stitched image. The overlapping information can be information regarding the overlapping ratio or the overlapping region of images.

In an embodiment, the processing module 106 can look up an overlapping information of the images from a look-up table according to the estimated bending angle. The look-up table can be recorded in a storage medium of the electronic device 100 (such as a memory) or a database at a remote end. The look-up table may include a plurality of predetermined bending angles and a plurality of predetermined overlapping information corresponding to the predetermined bending angles. For example, the look-up table may include the following information listed in Table 1:

TABLE 1

| Predetermined bending angles | Predetermined overlapping information (Overlapping ratio of images) |
|---|---|
| 5° | 10% |
| 20° | 30% |
| 40° | 50% |

As disclosed in Table 1, when the processing module 106 estimates the bending angle of the base 110 according to the physical bending information and obtains that the bending angle is about 20°, the overlapping ratio between two images being about 30% can be directly looked up from the look-up table. After obtaining the overlapping relationship between different images, the processing module 106 can further crop, modify and stitch the overlapping region of images by using an existing image stitching algorithm to create a stitched image. Since the processing module 106 can obtain the overlapping relationship between the images without having to scan the complete feature points of each image, the image stitching speed can be greatly increased.

It should be noted that the contents of Table 1 are for explaining an embodiment of the present disclosure, not for limiting the scope of protection of the present invention. In the look-up table, relationship between the predetermined bending angles and the predetermined overlapping information corresponding to the predetermined bending angles as well as the sizes and quantities of the predetermined bending angles can be adjusted according to actual needs.

In an embodiment, the processing module 106 may further stitch the images by using an algorithm selected from a plurality of predetermined image stitching algorithms according to the estimated bending angle to create a stitched image. In other words, the processing module 106 can firstly determine which angle range that the bending angle of the base 110 belongs to and then stitch the images by using an image stitching algorithm corresponding to the said angle range to increase the image stitching efficiency. Examples of the said predetermined image stitching algorithms include a block matching algorithm, a feature point matching algorithm, an overlapping segmentation algorithm, and other known image stitching algorithms.

For example, the processing module 106 may compare the estimated bending angle with one or more than one angle threshold (such as the first angle threshold TH1 and the second angle threshold TH2, wherein TH1>TH2). When the bending angle is larger than or equivalent to the first angle threshold TH1 (such as 100°), this implies that the corresponding overlapping ratio of images is larger, and the processing module 106 stitches the images by a first image stitching algorithm selected from the predetermined image stitching algorithms, wherein the first image stitching algorithm can be (but is not limited to) an overlapping segmentation algorithm suitable for stitching the images having a larger overlapping ratio. Similarly, when the bending angle is between the first angle threshold TH1 and the second angle threshold TH2 (such as 30°), the processing module 106 stitches the images by using a second image stitching algorithm selected from the predetermined image stitching algorithms, wherein the second image stitching algorithm can be (but is not limited to) a feature point matching algorithm suitable for accurately locating feature points of the image. Also, when the bending angle is smaller than the second angle threshold TH2, this implies that the corresponding overlapping ratio of images is smaller, and the processing module 106 stitches the images by using a third image stitching algorithm selected from the predetermined image stitching algorithms, wherein the third image stitching algorithm can be (but is not limited to) a block matching algorithm suitable for stitching the images having a smaller overlapping ratio.

It should be noted that in the above examples, the correspondence relationship between the bending angles and the overlapping ratio of the images is not restrictive but depends on the definition position of the bending angle on the base and the configuration position of the camera module.

Figure 3:
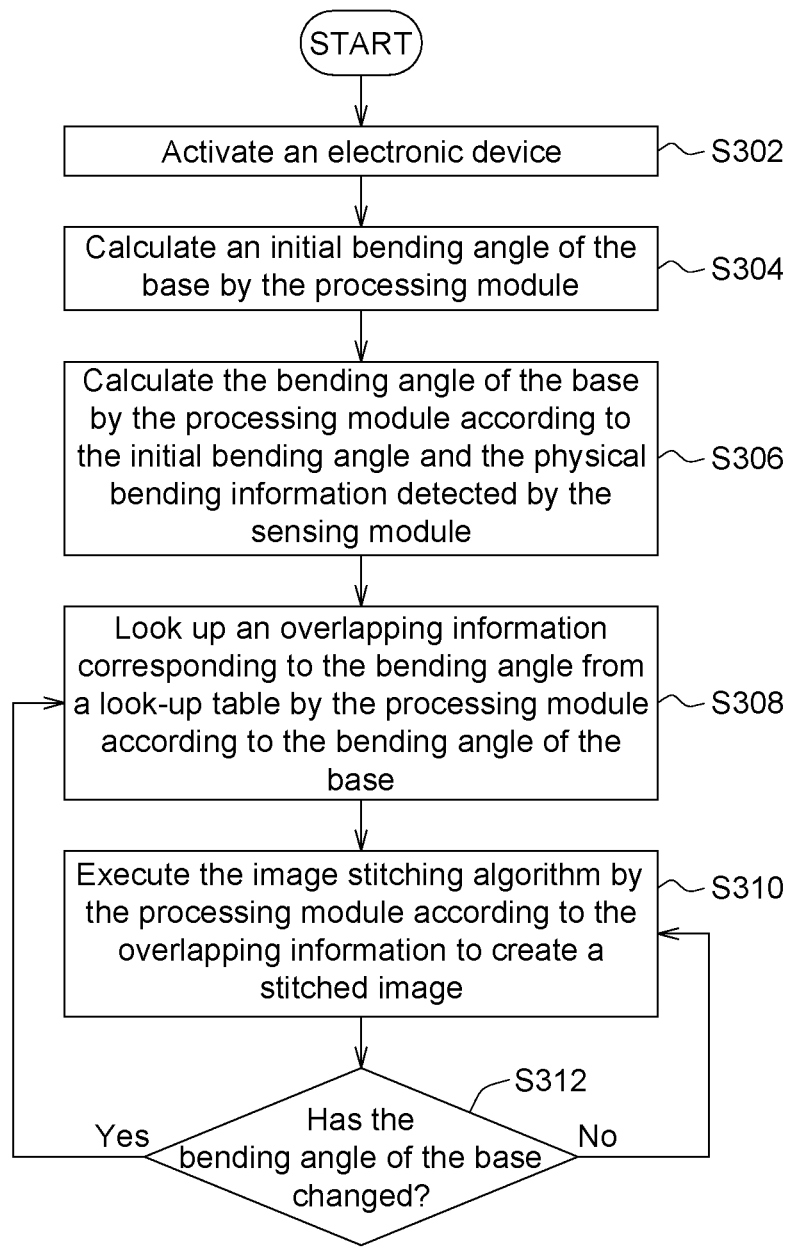
FIG. 3 is a flowchart of an image stitching method according to another embodiment of the present disclosure.

FIG. 3 is a flowchart of an image stitching method according to another embodiment of the present disclosure.

In step S302, the electronic device 100 is activated. For example, the electronic device 100 is activated when the power button is pressed, the user's action is detected or the device state is changed.

In step S304, an initial bending angle of the base 110 is calculated by the processing module 106.

In an embodiment, after the electronic device 100 is activated, the processing module 106 may control the camera modules 102-1 to 102-N to capture multiple reference images, locate an overlapping region of the reference images by using the feature point matching algorithm or other algorithm, and estimate the initial bending angle of the base 110 according to the overlapping region of the reference images. For example, two adjacent camera modules 102-1 and 102-2 have a field of view being 180°, a repeat angle of depth of field being 110°, and an overlapping ratio of images being 60% (that is, (110/180)≈60%). After calculating the overlapping ratio of images, the processing module 106 can obtain an initial bending angle of the base 110 according to the overlapping ratio of images. For example, the bending angle of the base corresponding to the overlapping ratio of images can be obtained by looking up a look-up table, and the bending angle can be as the initial bending angle.

In another embodiment, after the electronic device 100 is activated, the processing module 106 may control the sensing module 104 to detect a distance between different positions of the base 110, and estimate the initial bending angle of the base 110 according to the distance. For example, the processing module 106 may control the sensing module 104 to detect a relative distance between two ends of the base 110 to determine the degree of bending of the base 110, and the shorter the distance, the larger the degree of bending of the base 110. By doing so, the processing module 106 may estimate the bending state of the base 110 since the electronic device 100 is used by the user last time.

In step S306, the bending angle of the base 110 is calculated by the processing module 106 according to the initial bending angle and the physical bending information detected by the sensing modules 104. For example, the processing module 106 may regard the initial bending angle as a reference value, and then estimate the bending angle of the base 110 according to the reference value and the variation of parameter as indicated in the physical bending information.

In step S308, an overlapping information corresponding to the bending angle is looked up from a look-up table by the processing module 106 according to the bending angle of the base 110.

In step S310, the image stitching algorithm is executed by the processing module 106 according to the overlapping information to create a stitched image. For example, when executing the image stitching algorithm, the processing module 106 can firstly of all identify the overlapping region of all images according to the overlapping information, and then locate the feature points and match the feature points on the overlapping region of images to stitch the images corresponding to different fields of view.

In step S312, whether the bending angle of the base 110 has changed is determined by the processing module 106. If the determination is affirmative, then the method returns to step S308, the processing module 106 looks up an updated overlapping information from the look-up table according to the changed bending angle and stitches the subsequently captured images according to the updated overlapping information. If the determination is negative, then the method returns to step S310, the processing module 106 continues to stitch the images according to the original overlapping information.

Figure 4:
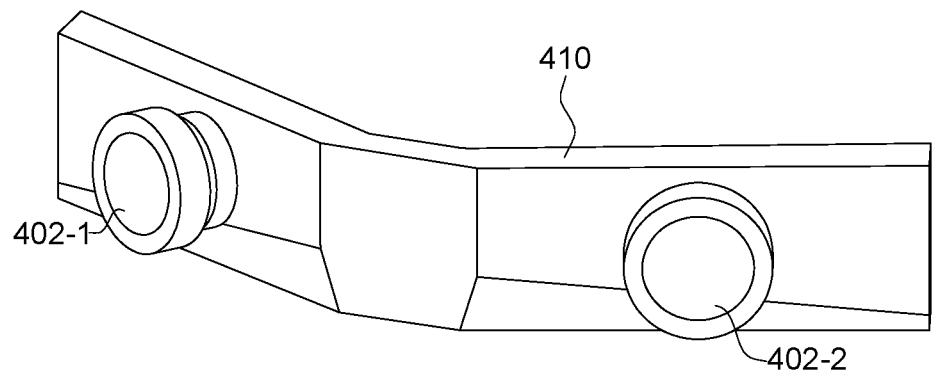
FIG. 4 is a schematic diagram of an electronic device according to an embodiment of the present disclosure.

FIG. 4 is a schematic diagram of an electronic device 400 according to an embodiment of the present disclosure.

Refer to FIG. 4. The electronic device 400, being implemented as a bendable dual-lens hardware module, includes a base 410 and two camera modules 402-1 and 402-2. The camera modules 402-1 and 402-2 are configured at two ends on the same side of the base 410. Therefore, the larger the degree of bending of the base 410, the lower the repetition of the fields of view between the camera modules 402-1 and 402-2, and the wider the field of view of the stitched image. It should be noted that the electronic device 400 also includes the processing module and the sensing module likes the previous embodiments except that these modules are not illustrated.

Figure 5A:
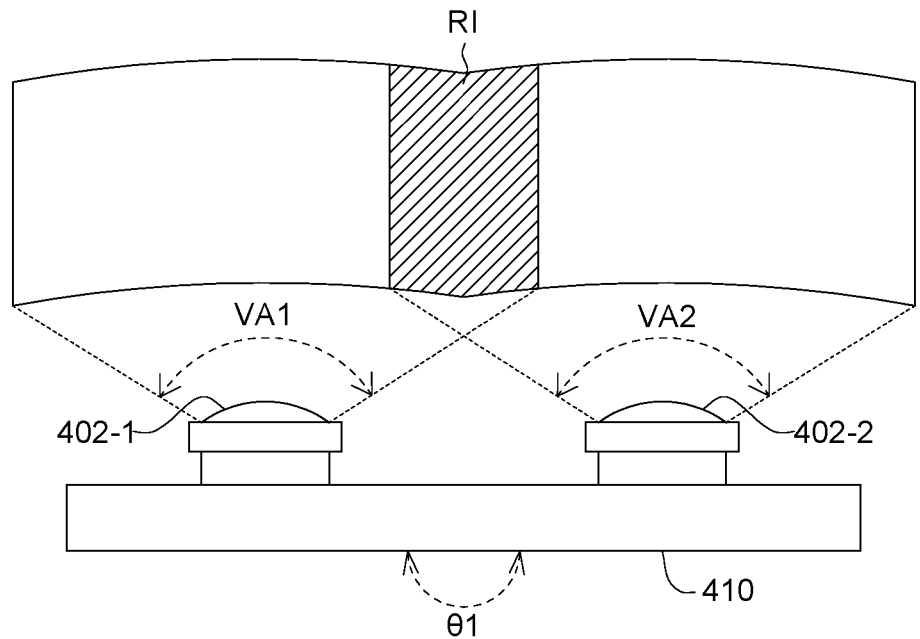
FIG. 5A and FIG. 5B are schematic diagrams of the base of the electronic device of FIG. 4 at different bending angles.
Figure 5B:
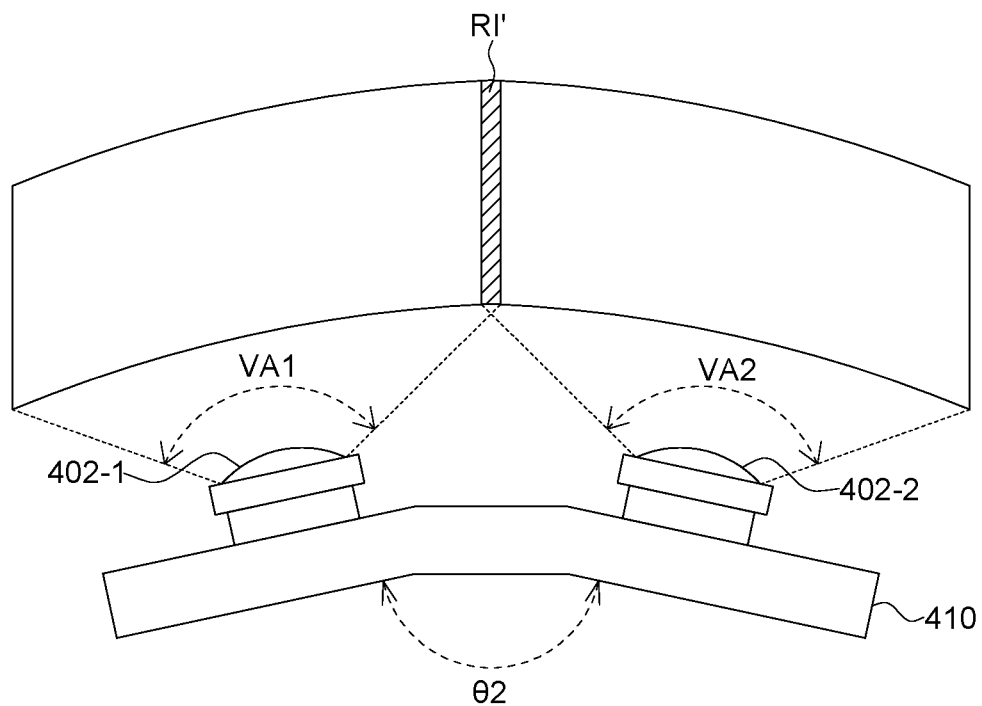

FIG. 5A and FIG. 5B are schematic diagrams of the base 410 of the electronic device 400 of FIG. 4 at different bending angles.

Refer to FIG. 5A. The base 410 is laid flat and has a bending angle θ1 being 180°. The camera modules 402-1 and 402-2 respectively have view angles VA1 and VA2. When the base 410 is laid flat, the images captured by the camera modules 402-1 and 402-2 form an overlapping region RI.

Refer to FIG. 5B. The base 410 is bent and has a bending angle θ2, wherein the bending angle θ2 is less than bending angle θ1. Since the bending angle θ2 is less than the bending angle θ1, in comparison to the overlapping region RI of FIG. 5A, the images captured by the camera modules 402-1 and 402-2 have a smaller overlapping region RI', that is, the overlapping ratio of images is smaller.

As disclosed in FIG. 5A and FIG. 5B, when the base 410 is configured at different bending angles, the images captured by the camera modules 402-1 and 402-2 will correspond to different overlapping information (such as the overlapping ratios of images). The different bending angles and the overlapping information corresponding to the bending angles can be pre-recorded in a look-up table. Therefore, once the processing module estimates a bending angle of the base 410, the processing module can directly look up the image overlapping information corresponding to the bending angle from the look-up table, and stitches the images according to the obtained overlapping information. For example, suppose the processing module estimates that the bending angle of the base 410 is about 30° and obtains from the look-up table that the corresponding overlapping ratio of images is 40%. When the processing module stitches the images, the processing module can pre-determine that 40% of the right-hand side of the image captured by the camera modules 402-1 will overlap 40% of the left-hand side of the image captured by the camera module 402-2. Since the processing module can directly estimate the overlapping region of images by looking up the look-up table, the image stitching speed can be greatly increased.

According to the image stitching method and the electronic device using the same disclosed in the present disclosure, a physical bending information of the base is detected by the sensing module mounted on the base, and the current bending angle of the base is estimated according to the obtained physical bending information to locate corresponding overlapping information. Therefore, the time for locating an overlapping region of images by using an image stitching algorithm can be effectively reduced, and the image stitching speed can be increased.

While the invention has been described by example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device; comprising:
   a base, which is bendable;
   a plurality of camera modules mounted on the base for capturing a plurality of images corresponding to different fields of view;
   a sensing module coupled to the base for detecting a physical bending information of the base; and
   a processing module coupled to the camera modules and the sensing module for estimating a bending angle of the base according to the physical bending information, obtaining an overlapping information of the images according to the bending angle, and stitching the images according to the overlapping information to create a stitched image.

2. The electronic device according to claim 1, wherein the processing module is used for:
looking up the overlapping information from a look-up table according to the bending angle;
wherein the look-up table comprises a plurality of predetermined bending angles and a plurality of predetermined overlapping information corresponding to the predetermined bending angles.

3. The electronic device according to claim 2, wherein the processing module is used for:
determining whether the bending angle has changed;
looking up an updated overlapping information from the look-up table according to the changed bending angle and stitching the images according to the updated overlapping information when it is determined that the bending angle has changed; and
stitching the images according to the overlapping information when it is determined that the bending angle has not changed.

4. The electronic device according to claim 1, wherein the processing module is used for:
calculating an initial bending angle of the base after the electronic device is activated; and
calculating the bending angle of the base according to the initial bending angle and the physical bending information.

5. The electronic device according to claim 4, wherein the processing module is used for:
controlling the camera modules to capture a plurality of reference images after the electronic device is activated;
locating an overlapping region of the reference images; and
estimating the initial bending angle according to the overlapping region of the reference images.

6. The electronic device according to claim 4, wherein the processing module is used for:
controlling the sensing module to detect a distance between different positions of the base after the electronic device is activated; and
estimating the initial bending angle according to the distance.

7. The electronic device according to claim 1, wherein the processing module is used for:
stitching the images by using an algorithm selected from a plurality of predetermined image stitching algorithms according to the size of the bending angle to create stitched image.

8. The electronic device according to claim 7, wherein the processing module is used for:
comparing the bending angle with a first angle threshold and a second angle threshold, wherein the first angle threshold is larger than the second angle threshold;
stitching the images by using a first image stitching algorithm selected from the predetermined image stitching algorithms when the bending angle is larger than or equivalent to the first angle threshold;
stitching the images by using a second image stitching algorithm selected from the predetermined image stitching algorithms when the bending angle is between the first angle threshold and the second angle threshold; and
stitching the images by using a third image stitching algorithm selected from the predetermined image stitching algorithms when the bending angle is smaller than the second angle threshold.

9. The electronic device according to claim 8, wherein the first image stitching algorithm is an overlapping segmentation algorithm, the second image stitching algorithm is a feature point matching algorithm, and the third image stitching algorithm is a block matching algorithm.

10. The electronic device according to claim 1; wherein the physical bending information comprises at least one of the following items: resistance variation, capacitance variation, stress variation, deformation, and displacement.

11. An image stitching method applicable to an electronic device, wherein the electronic device comprises a bendable base, a plurality of camera modules mounted on the base, a sensing module coupled to the base, and a processing module coupled to the camera module and the sensing module, and the image stitching method comprises:
capturing a plurality of images corresponding to different fields of view by the camera modules;
detecting a physical bending information of the base by the sensing module; and
estimating a bending angle of the base according to the physical bending information, obtaining an overlapping information of the images according to the bending angle; and stitching the images according to the overlapping information by the processing module to create a stitched image.

12. The image stitching method according to claim 11, comprising:
looking up the overlapping information from a look-up table by the processing module according to the bending angle;
wherein the look-up table comprises a plurality of predetermined bending angles and a plurality of predetermined overlapping information corresponding to the predetermined bending angles.

13. The image stitching method according to claim 12, comprising:
determining, by the processing module, whether the bending angle has changed;
looking up an updated overlapping information from the look-up table according to the changed bending angle and stitching the images according to the updated overlapping information by the processing module when it is determined that the bending angle has changed; and
stitching the images according to the overlapping information by the processing module when it is determined that the bending angle has not changed.

14. The image stitching method according to claim 11, comprising:
calculating an initial bending angle of the base by the processing module after the electronic device is activated; and
calculating the bending angle of the base by the processing module according to the initial bending angle and the physical bending information.

15. The image stitching method according to claim 14, comprising:
controlling the camera modules to capture a plurality of reference images by the processing module after the electronic device is activated;
locating an overlapping region of the reference images by the processing module; and
estimating the initial bending angle by the processing module according to the overlapping region of the reference images.

16. The image stitching method according to claim 14, comprising:

controlling the sensing module by the processing module to detect a distance between different positions of the base after the electronic device is activated; and estimating the initial bending angle by the processing module according to the distance.

17. The image stitching method according to claim 11, comprising:

stitching the images by using an algorithm selected from a plurality of predetermined image stitching algorithms according to the size of the bending angle to create the stitched image.

18. The image stitching method according to claim 17, comprising:

comparing the bending angle with a first angle threshold and a second angle: threshold, wherein the first angle threshold is larger than the second angle threshold;

stitching the images by using a first image stitching algorithm selected from the predetermined image stitching algorithms when the bending angle is larger than or equivalent to the first angle threshold;

stitching the images by using a second image stitching algorithm selected from the predetermined image stitching algorithms when the bending angle is between the first angle threshold and the second angle threshold; and stitching the images by using a third image stitching algorithm selected from the predetermined image stitching algorithms when the bending angle is smaller than the second angle threshold.

19. The image stitching method according to claim 18, wherein the first image stitching algorithm is an overlapping segmentation algorithm, the second image stitching algorithm is a feature point matching algorithm, and the third image stitching algorithm is a block matching algorithm.

20. The image stitching method according to claim 11, wherein the physical bending information comprises at least one of the following items: resistance variation, capacitance variation, stress variation, deformation, and displacement.

\* \* \* \* \*